(12) United States Patent
Ma

(10) Patent No.: US 7,683,799 B2
(45) Date of Patent: Mar. 23, 2010

(54) ABSOLUTE ANGULAR POSITION SENSING SYSTEM BASED ON RADIO FREQUENCY IDENTIFICATION TECHNOLOGY

(75) Inventor: Qi Ma, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 283 days.

(21) Appl. No.: 11/743,806

(22) Filed: May 3, 2007

(65) Prior Publication Data
US 2008/0272926 A1 Nov. 6, 2008

(51) Int. Cl.
G08B 21/00 (2006.01)
(52) U.S. Cl. ............ 340/686.3; 340/10.1; 340/10.4
(58) Field of Classification Search ......... 340/686.3
See application file for complete search history.

(56) References Cited

U.S. PATENT DOCUMENTS

| | | | | |
|---|---|---|---|---|
| 4,510,495 | A * | 4/1985 | Sigrimis et al. | 340/10.34 |
| 5,915,272 | A * | 6/1999 | Foley et al. | 73/114.22 |
| 6,038,255 | A * | 3/2000 | Palmer et al. | 375/238 |
| 6,378,360 | B1 | 4/2002 | Bartels | |
| 6,888,471 | B2 | 5/2005 | Elsner et al. | |
| 6,901,895 | B2 | 6/2005 | Mae et al. | |
| 7,146,267 | B2 | 12/2006 | Sawada et al. | |
| 7,307,517 | B2 * | 12/2007 | Liu et al. | 340/441 |
| 2002/0014966 | A1 | 2/2002 | Strassner, II et al. | |
| 2004/0033833 | A1 * | 2/2004 | Briggs et al. | 463/42 |
| 2006/0025897 | A1 | 2/2006 | Shostak et al. | |
| 2006/0103534 | A1 | 5/2006 | Arms et al. | |
| 2006/0226984 | A1 | 10/2006 | Menke | |
| 2007/0215079 | A1 * | 9/2007 | Boggess et al. | 123/90.15 |

FOREIGN PATENT DOCUMENTS

| | | | |
|---|---|---|---|
| EP | 1 229 215 A1 | | 8/2002 |
| JP | 2000 034910 | | 2/2000 |
| WO | WO2006/005597 | * | 1/2006 |

OTHER PUBLICATIONS

Webster's Dictionary of the English Language Deluxe Edition, 1992, J.G. Ferguson Publishing Company.*

* cited by examiner

Primary Examiner—Daniel Wu
Assistant Examiner—Brian Wilson
(74) Attorney, Agent, or Firm—John A. Miller; Miller IP Group, PLC

(57) ABSTRACT

A system for determining the position of a rotating wheel using RFID. In one embodiment, the system includes a position sensing wheel mounted to one or both of a crankshaft and a camshaft in the engine. A plurality of RFID tags are disposed at predetermined intervals around the wheel, and an RFID transceiver is positioned proximate the wheel. As the wheel rotates, the RFID transceiver transmits a signal that interrogates the RFID tags, which then transmit a coded signal to the transceiver identifying the wheel's position relative to the transceiver. Therefore, regardless of the position of the wheel, the RFID transceiver can interrogate the closest RFID tag and immediately know the position of the engine so that an engine controller can provide fuel and spark to the cylinders as soon as possible.

8 Claims, 2 Drawing Sheets

US 7,683,799 B2

ABSOLUTE ANGULAR POSITION SENSING SYSTEM BASED ON RADIO FREQUENCY IDENTIFICATION TECHNOLOGY

BACKGROUND OF THE INVENTION

1. Field of the Invention

This invention relates generally to a system and method for determining the position of a rotating wheel using radio frequency identification (RFID) and, more particularly, to a system and method for determining engine crankshaft/camshaft position using RFID tags where the tags are positioned around the perimeter of a crankshaft wheel and/or camshaft wheel.

2. Discussion of the Related Art

As is well understood in the art, an internal combustion engine includes a crankshaft that is rotated by movement of the pistons within the cylinders to provide the driving power. The internal combustion engine also includes one or more intake and exhaust valves per cylinder whose position between open and closed is determined by one or more camshafts. It is necessary that the engine controller know the position of the engine, i.e., the position of the crankshaft and the camshaft, so that it knows when to precisely deliver fuel and spark to each cylinder at the proper time.

Current internal combustion engines typically employ a crankshaft position sensing wheel mounted to a back end of the crankshaft and a camshaft wheel mounted to a front end of the camshaft. The crankshaft wheel and the camshaft wheel include a predetermined number of teeth having a predetermined width with spaces therebetween. A magnetic reluctant sensor or a Hall effect sensor is positioned relative to the wheel that provides an electrical signal on the rising edge and falling edge of each tooth on the wheel. Algorithms are employed that count the pulses from the sensor to provide a precise indication of the position of the engine. The process of determining the position of the crankshaft wheel and the camshaft wheel in this manner is sometimes referred to as pattern recognition. Typically, at least two of the teeth are removed so that the sensor will provide a signal indicating a reference for the start of an engine cycle so that it is properly oriented for each intake, exhaust, and firing of each cylinder.

At vehicle start-up, it is necessary for the engine controller to know the beginning of a cycle before it can initiate the delivery of fuel and spark to the cylinders. Therefore, the crankshaft is rotated by the engine starting system so that when the location of the crankshaft position sensing wheel with the removed teeth is detected by the sensor, the engine controller knows that the cycle can start. However, sometimes this requires a complete revolution of the crankshaft. Further, the sensor may have a fault where it does not immediately pick up the first indication of the reference location of the crankshaft wheel.

Because the position of the engine is determined by pattern recognition in this manner, the start-up of the engine is not immediate upon ignition of the engine because the engine controller must first determine the position of the engine from the removed wheel teeth.

SUMMARY OF THE INVENTION

In accordance with the teachings of the present invention, a system and method are disclosed for determining the position of a rotating wheel using RFID. In one embodiment, the system provides an immediate determination of the position of a crankshaft/camshaft in an internal combustion engine. The system includes a position sensing wheel mounted to one or both of a crankshaft and a camshaft in the engine. A plurality of RFID tags are disposed at predetermined intervals around the wheel, and an RFID transceiver is positioned proximate the wheel. As the wheel rotates, the RFID transceiver transmits a signal that interrogates the RFID tags, which then transmit a coded signal to the transceiver identifying the wheel's position relative to the transceiver. Therefore, regardless of the position of the wheel, the RFID transceiver can interrogate the closest RFID tag and immediately know the position of the engine so that an engine controller can provide fuel and spark to the cylinders as soon as possible.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system that uses an RFID transceiver and RFID tags for determining crankshaft/camshaft position is merely exemplary in nature, and is in no way intended to limit the invention or its applications or uses. For example, the RFID tag interrogation system of the invention for determining wheel position can be used for determining the position of a rotating wheel in other systems other than determining engine position, both on and off a vehicle.

Figure 1:
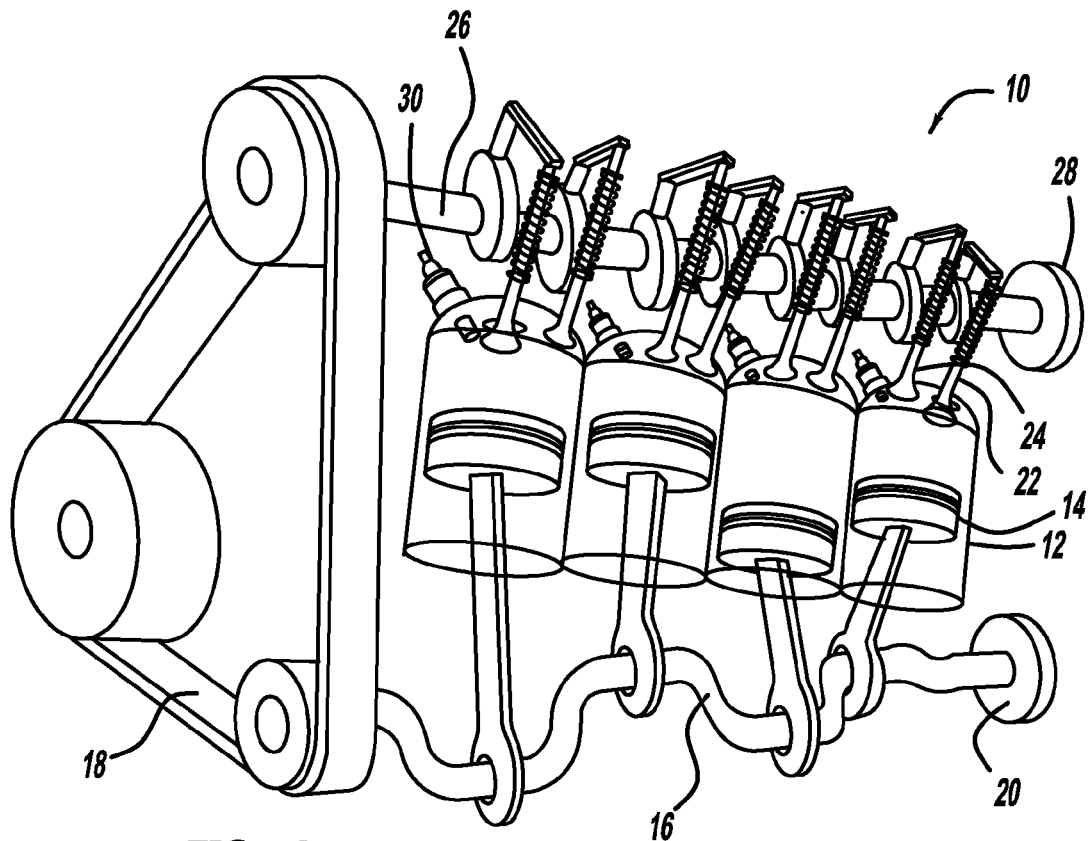
FIG. 1 is a simplified plan view of an internal combustion engine.

FIG. 1 is a simplified plan view of an internal combustion engine 10 including four cylinders 12 each including a piston 14. The pistons 14 are coupled to a crankshaft 16 and the crankshaft 16 is coupled to a drive belt 18. A crankshaft wheel 20 is mounted to an opposite end of the crankshaft 16 from the drive belt 18. Each of the cylinders 12 includes an intake valve 22 and an exhaust valve 24 whose positions are controlled by a camshaft 26. One end of the camshaft 26 is coupled to the belt 18 and the opposite end of the camshaft 26 is coupled to a camshaft wheel 28.

As is well understood in the art, fuel is injected into the cylinders 12, air is introduced into the cylinder 12 through the air intake valve 22 and a spark from a spark plug 30 ignites the fuel/air mixture driving the piston 14 down, and rotating the crankshaft 16. As the crankshaft 16 rotates the piston 14 is then driven back upward into the cylinder 12 when the exhaust valve 24 is open to drive the exhaust gases out of the cylinder 12 so that the process can be repeated. This process is repeated in a cyclical manner to operate the engine 10. Accurate timing is necessary for opening the valves 22 and 24, injecting the fuel into the cylinders 12 and providing the spark to the cylinders 12.

Figure 2:
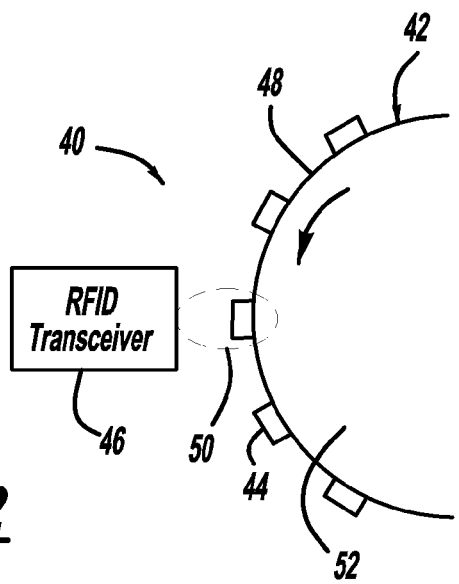
FIG. 2 is a representation of a wheel in the engine shown in FIG. 1 including RFID tags.

According to the invention, an RF interrogation process is used to determine the position of the crankshaft wheel 20 and/or the camshaft wheel 28, and thus the position of the engine. FIG. 2 is a plan view of an RFID interrogation system 40 including a rotating wheel 42 that represents the crankshaft wheel 20 or the camshaft wheel 28. A plurality of RFID tags 44 are disposed at predetermined intervals around an outer edge 48 of the wheel 42, as shown. An RFID transceiver 46 is positioned adjacent to the wheel 42, and operates to interrogate each of the RFID tags 44 as they pass by the transceiver 46 when the wheel 42 is rotated. The RFID transceiver 46 transmits an interrogation signal 50 at a predetermined frequency that is received by the closest RFID tag 44 to the transceiver 46. The interrogation signal will activate the RFID tag 44 and cause it to transmit a unique identification signal back to the transceiver 46 so that the signal received by the transceiver 46 identifies the position of the wheel 42. The basic principle of RF interrogation is well understood to those skilled in the art.

In this embodiment, the RFID tags 44 are positioned on the edge 48 of the wheel 42. In an alternate embodiment, the RFID tags may be positioned on a face 52 of the wheel 42 at its outer perimeter. The orientation of the RFID tags 44 may depend on the location of the wheel 42 and the necessary position of the transceiver 46. RFID tags of this type can be made very small, and thus many of the RFID tags 44 can be positioned around the wheel 42 to provide the desired resolution of immediate and accurate determination of the position of the wheel 42.

Figure 3:
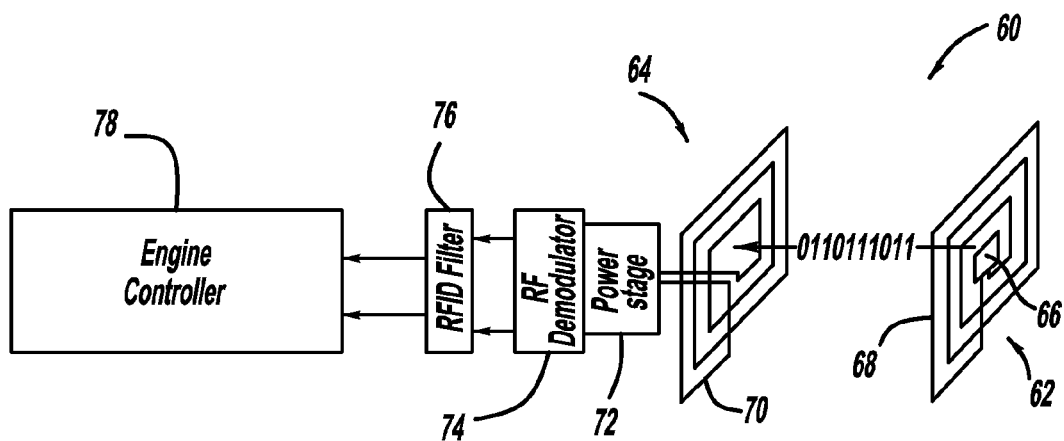
FIG. 3 is a perspective view of an RFID transceiver positioned relative to an RFID tag.

FIG. 3 is a perspective view of an RF interrogation system 60 showing additional detail of the system. The system 60 includes an RFID tag 62 and an RFID transceiver 64 of the type discussed above. The RFID tag 62 includes a processor or EPROM or ROM 66 surrounded by a wound antenna 68. The RFID transceiver 64 includes an antenna 70 and a power stage 72. When the RFID receiver 64 is operating, the power stage 72 transmits a signal by the antenna 70 at a certain frequency that is received by the antenna 68 of the RFID tag 62. The received signal by the RFID tag 62 is sent to the processor or EPROM or ROM 66 that causes it to be activated and generate a transmit signal that is transmitted by the antenna 68 at the same frequency. The transmitted signal from the antenna 68 is received by the antenna 70 and is demodulated by an RF demodulator 74. The demodulated RF signal is then filtered by a filter 76 to provide a signal to an engine controller 78. The signal sent to the engine controller 78 can be any signal suitable for the purposes described herein, such as a pulse-width modulated (PWM) signal including a bit-pattern provided by a duty cycle of the signal or a serial data stream.

The processor or EPROM or ROM 66 causes the antenna 68 to transmit a unique signal that is different than the signals transmitted by the other RFID tags on the rotating wheel, typically represented by a series of bits. Depending on how many RFID tags are on the wheel and the amount of information that is transmitted will determine the number of bits required.

If the wheel 42 is stopped and the position of the wheel causes two of the RFID tags to be positioned at about the same distance from the transceiver 46, the transceiver 46 can interrogate both of the RFID tags 44 simultaneously, and provide an average to determine that the position of the wheel 42 is between the tags 44.

Figure 4:
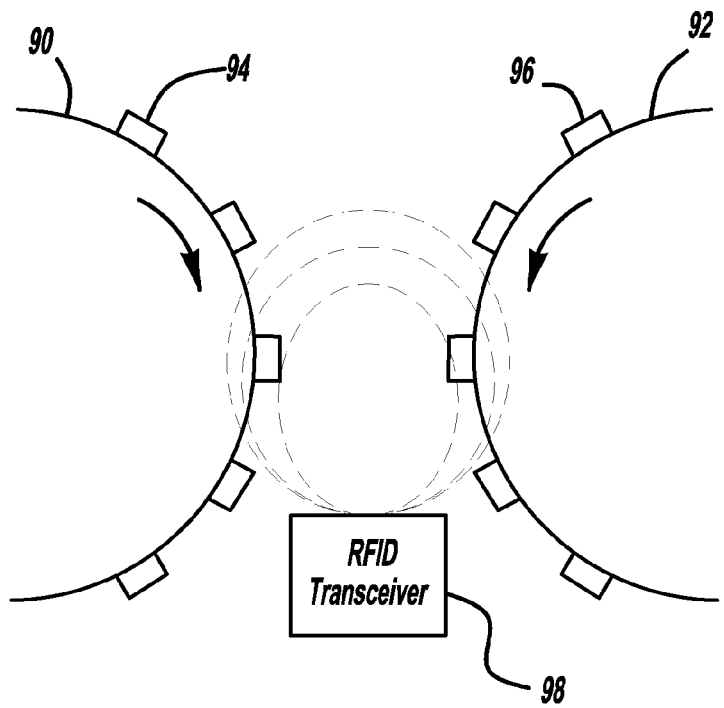
FIG. 4 is a plan view of an RFID transceiver interrogating RFID tags on two adjacent wheels.

Certain internal combustion engines may employ two camshafts depending on the orientation and number of the cylinders. According to the invention, it is possible to use a single RFID transceiver to interrogate the RFID tags on both camshaft wheels simultaneously. This embodiment is illustrated in FIG. 4 showing a first camshaft wheel 90 and a second camshaft wheel 92. The camshaft wheel 90 includes RFID tags 94 disposed about an edge of the camshaft wheel 90 and the camshaft wheel 92 includes RFID tags 96 disposed about an edge of the camshaft wheel 92. An RFID transceiver 98 is positioned between the wheels 90 and 92, and as the wheels 90 and 92 rotate, the RFID transceiver 98 interrogates the RFID tags 94 and 96 on both wheels 90 and 92, simultaneously. Thus, the transceiver 98 will know the position of the both of the wheels 90 and 92 because all of the RFID tags 94 and 96 will be coded differently.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for determining the position of a crankshaft wheel in an internal combustion engine, said system comprising:
    a plurality of RFID tags disposed about an outer perimeter of a first crankshaft wheel and a second crankshaft wheel; and
    an RFID transceiver positioned adjacent to the first and second crankshaft wheels, said RFID transceiver transmitting an interrogation signal to the first and second crankshaft wheels that activates the RFID tags and causes the RFID tags to transmit a coded signal that is received by the transceiver and identifies the position of the wheel as it rotates;
    wherein the RFID transceiver provides an output signal to an engine controller that is a pulse-width modulated signal having a duty cycle identifying a bit pattern of the coded signal.

2. The system according to claim 1 wherein the RFID tags are mounted to an outer edge of the at least one wheel.

3. The system according to claim 1 wherein the RFID tags are mounted to a face of the at least one wheel.

4. The system according to claim 1 wherein the RFID transceiver outputs a serial data stream.

5. The system according to claim 1 wherein each RFID tag includes a processor or EPROM or ROM surrounded by a wound antenna.

6. A system for determining the position of at least one camshaft wheel in an internal combustion engine, said system comprising:
    a plurality of RFID tags disposed about an outer perimeter of a first camshaft wheel and a second camshaft wheel, wherein the first camshaft wheel and the second camshaft wheel are mounted to an end of a separate camshaft; and
    an RFID transceiver positioned adjacent to the at least one camshaft wheel, said RFID transceiver transmitting an interrogation signal to both camshaft wheels that activates the RFID tags and causes the RFID tags to transmit a coded signal that is received by the transceiver and identifies the position of the wheel as it rotates;
    wherein the RFID transceiver provides an output signal to an engine controller that is a pulse-width modulated signal having a duty cycle identifying a bit pattern of the coded signal.

7. The system according to claim 6 wherein the RFID tags are mounted to an outer edge of the at least one camshaft wheel.

8. The system according to claim 6 wherein the RFID tags are mounted to a face of the at least one camshaft wheel.

* * * * *